(12) United States Patent
Niemeyer et al.

(10) Patent No.: US 11,618,297 B2
(45) Date of Patent: Apr. 4, 2023

(54) METHOD OF OPERATING AN ADJUSTABLE ROLL STABILIZER

(71) Applicant: ZF Friedrichshafen AG, Friedrichshafen (DE)

(72) Inventors: Philip Niemeyer, Wallenhorst (DE); Stefan Lekon, Stemwede (DE)

(73) Assignee: ZF Friedrichshafen AG, Friedrichshafen (DE)

(*) Notice: Subject to any disclaimer, the term of this patent is extended or adjusted under 35 U.S.C. 154(b) by 155 days.

(21) Appl. No.: 17/003,192

(22) Filed: Aug. 26, 2020

(65) Prior Publication Data

US 2021/0061047 A1 Mar. 4, 2021

(30) Foreign Application Priority Data

Sep. 3, 2019 (DE) ..................... 10 2019 213 272.3

(51) Int. Cl.
*B60G 21/055* (2006.01)

(52) U.S. Cl.
CPC ...... *B60G 21/0555* (2013.01); *B60G 2202/42* (2013.01); *B60G 2204/62* (2013.01); *B60G 2400/252* (2013.01); *B60G 2600/08* (2013.01); *B60G 2800/012* (2013.01)

(58) Field of Classification Search
CPC ............ B60G 21/0555; B60G 2202/42; B60G 2204/62; B60G 2400/252; B60G 2600/08; B60G 2800/012; B60G 17/0185
See application file for complete search history.

(56) References Cited

U.S. PATENT DOCUMENTS

| 7,949,446 B2 * | 5/2011 | Koumura | ........... B60G 17/0182 701/38 |
| 10,940,734 B2 * | 3/2021 | Furuta | .................. B60G 17/019 |

(Continued)

FOREIGN PATENT DOCUMENTS

| CN | 207579506 U | * | 7/2018 | |
| DE | 102008000240 A1 | * | 8/2009 | ......... B60G 21/0553 |

(Continued)

OTHER PUBLICATIONS

Machine Translation of WO2018114173 (Year: 2018).*

*Primary Examiner* — Paul N Dickson
*Assistant Examiner* — Kurtis Nielson
(74) *Attorney, Agent, or Firm* — Finch & Maloney PLLC

(57) ABSTRACT

A method of operating an adjustable roll stabilizer for a motor vehicle. The stabilizer has an actuator which can be rotated through a system angle about a rotational axis to apply a system torque and rotate two stabilizer sections relative to one another about the axis. The stabilizer sections are coupled at a radial distance from the axis to a respective wheel suspension, and depending on the system angle and under the external influence of movements of the wheel suspensions, twist relative to one another through a stabilizer angle. In the context of a perturbation magnitude regulation, the actuator is controlled based on the stabilizer angle determined from height levels of the wheels, by virtue of a stored relationship for the roll stabilizer and/or motor vehicle. The plausibility of the stored relationship between the wheel height levels and the stabilizer angle is checked by a model calculation.

8 Claims, 4 Drawing Sheets

(56) References Cited

U.S. PATENT DOCUMENTS

| | | | |
|---|---|---|---|
| 2005/0206100 A1* | 9/2005 | Ohta | B60G 21/0555 |
| | | | 280/5.511 |
| 2007/0150144 A1* | 6/2007 | Yasui | B60G 17/0162 |
| | | | 701/38 |
| 2009/0008887 A1* | 1/2009 | Burna | B60G 17/0164 |
| | | | 280/5.511 |
| 2015/0094909 A1* | 4/2015 | Illg | B60G 17/0162 |
| | | | 701/37 |

FOREIGN PATENT DOCUMENTS

| | | | | |
|---|---|---|---|---|
| DE | 102013110953 A1 * | 4/2015 | | B60G 17/015 |
| DE | 10 2016 219 399 A1 | 8/2017 | | |
| DE | 102017209144 A1 * | 12/2018 | | B60G 17/0165 |
| DE | 102019213302 A1 * | 3/2021 | | |
| EP | 1 362 720 A2 | 11/2003 | | |
| WO | WO-2018114173 A1 * | 6/2018 | | B60G 17/0185 |

* cited by examiner

METHOD OF OPERATING AN ADJUSTABLE ROLL STABILIZER

This application claims priority from German patent application serial no. 10 2019 213 272.3 filed Sep. 3, 2019.

FIELD OF THE INVENTION

The invention relates to a method for operating an adjustable roll stabilizer for a motor vehicle and a system for roll stabilization.

BACKGROUND OF THE INVENTION

From automotive technology, in particular chassis technology, it is known to influence the roll or rolling behavior of motor vehicles by means of so-termed roll stabilizers. In such cases the basic structure consists of an essentially C-shaped torsion bar spring which, in its central area, is mounted rotatably relative to the vehicle body and whose outer, opposite ends are in each case coupled to a wheel suspension by means of coupling elements termed hinged supports. By virtue of this design the roll stabilizer ensures that when driving round a curve, the body of the vehicle is deflected not only on the outside of the curve (due to the centrifugal force), but also that the wheel on the inside of the curve is somewhat lowered. Roll stabilizers improve the track-keeping of the vehicle and reduce the lateral inclination of the vehicle body (rolling), which makes driving round curves safer and more comfortable.

To further increase vehicle stability and driving comfort, it is known to make such roll stabilizers adjustable. In that case the roll stabilizer comprises an actuator and is divided into two stabilizer sections that, with the help of the actuator, can twist relative to one another about a rotational axis. By rotating the stabilizer sections relative to one another, a rolling movement of the vehicle body is produced in a controlled manner or a rolling movement of the vehicle body caused by external influences is selectively counteracted. From the prior art adjustable roll stabilizers are known, whose actuator comprises an electric motor which is in driving connection with a mechanical gear system, particularly in the form of a multi-step planetary gearset, in order to produce suitable rotational speeds and torques. In this connection reference should be made, for example, to DE 10 2016 219 399 A1.

Besides the design of an adjustable roll stabilizer, its appropriate control also poses a technical challenge.

In this connection reference should be made to EP 1 362 720 A1, which describes a method for operating an adjustable roll stabilizer for a four-wheel vehicle. The adjustable roll stabilizers associated in each case with a vehicle axle are each rotated relative to one another by means of an actuator controlled appropriately by an electronic control unit, having regard to the transverse acceleration and driving speed as well as the steering angle of the vehicle. To avoid undesired copying movements, which are caused by a roll stabilizer particularly on uneven roads, it is proposed therein that in addition height level signals for the individual wheels relative to the vehicle body are taken into account, so that in the event of a relative movement of a wheel in the vertical direction, brought about by bumps in the road, the stabilizer section associated with the wheel concerned should be made by the actuator to at least partially follow up the wheel movement. By virtue of this active tracking of a stabilizer section as a function of the height level detected for an individual wheel, the perturbations entering into the roll stabilization because of bumps in the road can be at least partially compensated, in particular so that the tracking takes place in such manner that by virtue of the respective (tracked) stabilizer section no torque caused by a bump in the road is induced in the associated wheel suspension.

In general, i.e. independently of EP 1 362 720 B1, an adjustable roll stabilizer can be operated in such manner that its actuator is controlled in the context of a perturbation regulation system—i.e. for the compensation of road bumps—as a function of the stabilizer angle. That is the angle through which, as a function of the system angle of the actuator and a system torque acting upon the adjustable roll stabilizer, the stabilizer sections twist relative to one another. The stabilizer angle is concluded from wheel height level data determined by sensors, by virtue of a relationship stored for the roll stabilizer and/or the vehicle, such that the stored relationship can in particular be stored in the form of a nominal characteristic which has previously been determined on an experimental vehicle. Thus, from this stored characteristic a relationship between the vertical movement of the mid-point of the wheel (the height level of the wheel, detected by sensors) and the rotational angle of the adjustable roll stabilizer can be derived, and this is needed as an input magnitude for the roll stabilization.

In other words, for every combination of "deflection condition of the left-hand side of the vehicle" and "deflection condition of the right-hand side of the vehicle", axle by axle, the stored relationship contains a characteristic diagram from which that stabilizer angle can be obtained at which the actuator would be free from force or torque. For safety reasons it is necessary to monitor and in particular check the plausibility of the stored relationship between the "deflection condition" (wheel height level) and "stabilizer angle to be set" during the operation of the adjustable roll stabilizer.

SUMMARY OF THE INVENTION

An objective of the present invention is to indicate a method for operating an adjustable roll stabilizer for a motor vehicle, with which a perturbation regulation system based as described earlier on a stored relationship for the control of the actuator can be monitored and in particular its plausibility can be checked. In addition, a corresponding system for roll stabilization should be indicated.

Firstly, the objective is achieved by a method for operating an adjustable roll stabilizer for a motor vehicle, having the characteristics specified in the independent claim(s). According to the invention, in this case the adjustable roll stabilizer comprises an actuator which, relative to a rotational axis, can be rotated through a system angle by the application of a system torque, in order thereby to twist two stabilizer sections connected to it relative to one another about the rotational axis. The stabilizer sections are radially a distance away from the rotational axis, in each case coupled to a wheel suspension, and they rotate relative to one another through a stabilizer angle which is a function of the system angle, and under the external influence of movements of the wheel suspensions. The actuator is controlled, in particular in the context of a perturbation regulation, as a function of the stabilizer angle which is concluded from sensor-determined wheel height levels with reference to a relationship stored for the roll stabilizer and/or the motor vehicle. According to the invention, the plausibility of the stored relationship between the wheel height levels and the stabilizer angle is checked by means of a model calculation.

Thus, according to the invention it is recognized that for safety reasons a stored relationship between the wheel height levels and the stabilizer angle needs to be monitored for plausibility. This makes it possible to avoid errors in the control of the actuator, which could occur in the context of the perturbation regulation based on the stored relationship between sensor-determined wheel height levels and the stabilizer angle to be set. To be specific, it is recognized that the plausibility of the stabilizer angle can be checked by means of a model calculation. According to the general understanding, the plausibility check by means of the model calculation involves checking whether or not the value of the stabilizer angle determined on the basis of the stored relationship between it and the sensor-determined wheel height levels is plausible, and thus in particular whether it appears acceptable, comprehensible and/or reasonable. In particular therefore, the plausibility check is not mainly about verifying the correctness of the value, but rather, about simply recognizing a possible obvious error if one is present, in order if necessary to initiate promptly a reaction to the error.

In a manner known as such and already explained earlier, the stored relationship between wheel height levels and the stabilizer angle is in the form of a characteristic which has been determined by measurements on an adjustable roll stabilizer or a motor vehicle fitted with one.

The plausibility check proposed according to the invention by means of a model calculation can take place in various ways. In the technical connection described it has been found advantageous to use for the model calculation a model of the roll stabilizer approximated by linear kinematics. In other words, a kinematic model of the adjustable roll stabilizer, simplified by linearization, is used to check the plausibility of the relationship between the sensor-determined wheel height levels and the stabilizer angle to be set.

An advantageous further development of the method provides that the model calculation is based on a kinematic conversion of the sensor-determined wheel height levels to a calculated stabilizer angle, which for plausibility checking is compared with the stabilizer angle determined from the stored relationship. Provided that the stabilizer angle calculated by means of the model calculation seems plausible when compared with the stabilizer angle determined from the stored relationship, no further measures are required.

Advantageously, the kinematic conversion takes place on the basis of a difference between the sensor-determined wheel height levels in combination with kinematic characteristics of the chassis geometry of the adjustable roll stabilizer and/or the motor vehicle equipped therewith.

According to a model of the adjustable roll stabilizer approximated by linear kinematics, the stabilizer angle can advantageously be calculated simply as:

$\beta = \arcsin(\text{deflection difference} * D/h)$, in which deflection difference=difference between the height levels ($z7a$, $z7b$) of the wheels ($7a$, $7b$);

D=ratio between the "distance from the stabilizer connection to the control arm connection ($L_1$)" and the "distance from the mid-point of the wheel to the control arm connection ($L_2$)", i.e. equal to $L_1/L_2$;

h=lever arm length of the stabilizer section [i.e. radial distance of the stabilizer connection from the rotational axis (3)].

With the indicated calculation for the stabilizer angle on the basis of a still to be explained model of the adjustable roll stabilizer approximated by linear kinematics, a parallel calculation (besides the stored relationship) of the stabilizer angle is possible.

By virtue of the kinematics-based calculation of the stabilizer angle described, in an advantageous manner it is possible to check the plausibility of the roll stabilizer during on-going operation. Since the only input magnitude required is the difference between the height levels of the wheels, the plausibility check can be carried out with comparatively little effort.

Expediently, it is provided that if the plausibility is found to be lacking, an error reaction is triggered. In particular the plausibility is not good if the stabilizer angle concluded from the wheel height levels using the stored relationship differs from the stabilizer angle calculated by means of the model calculation in such manner that it seems to be unacceptable, incomprehensible and/or unreasonable, or to put it briefly, clearly incorrect and thus implausible. The error reaction can comprise various measures, such as a warning signal (visual or acoustic), a recorded entry in the error memory of the roll stabilizer and/or of the vehicle, a reaction of the roll stabilizer such as switching it off or actively adopting a neutral position (zero position).

Furthermore, the objective specified at the start is achieved by a system for roll stabilization according to the independent claim(s). This is a system for roll stabilization which is designed to implement a method of the type described above.

BRIEF DESCRIPTION OF THE DRAWINGS

Below, the invention will be explained in greater detail with reference to drawings. From this, further design features of the invention will also emerge. The drawings show.

DETAILED DESCRIPTION OF THE PREFERRED EMBODIMENTS

Figure 1:
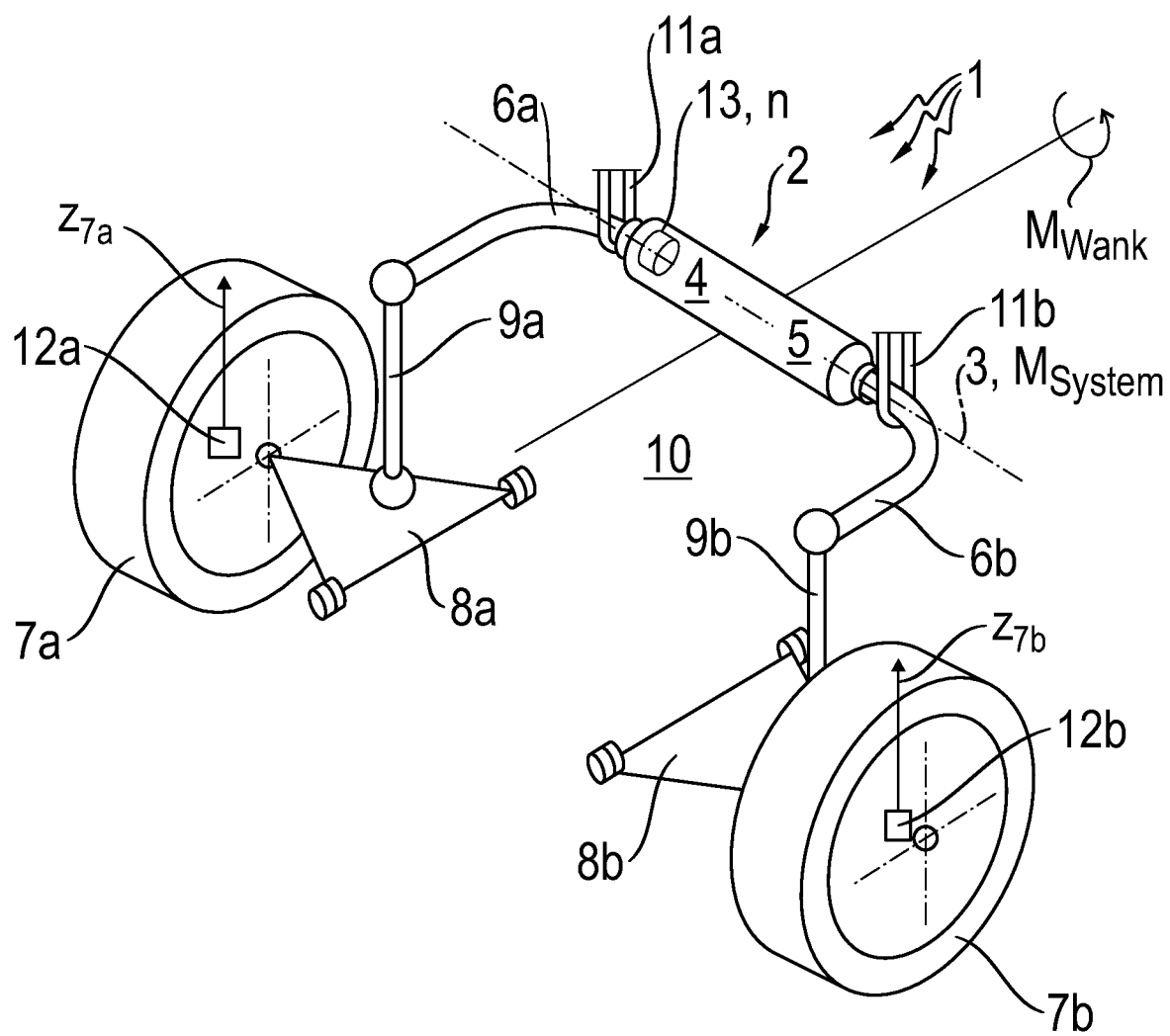
FIG. 1: An adjustable roll stabilizer for a motor vehicle, illustrated schematically.

To clarify the field of use of the invention, FIG. 1 first shows a schematic representation of an adjustable roll stabilizer 1. The adjustable roll stabilizer 1 is part of an incompletely illustrated chassis of a motor vehicle (not shown). Of the motor vehicle a vehicle body 10 is only suggested by an index. The roll stabilizer 1 is also part of an axle of the motor vehicle, for example the front axle and/or the rear axle of the motor vehicle can be fitted with the adjustable roll stabilizer.

As shown in FIG. 1, a wheel 7a on the left and a wheel 7b arranged on the right, on the opposite side of the vehicle, are connected to the body 10 of the vehicle by means of control arm arrangements 8a and 8b respectively, which need no more detailed explanation. Thus, the wheel 7a and control arm arrangement 8a and the wheel 7b and control arm arrangement 8b, respectively, each form a unit and are each coupled by a hinged support 9a and 9b to a respective end of an associated stabilizer section 6a and 6b of the adjustable roll stabilizer 1. The stabilizer section 6a on the left and the stabilizer section 6b on the right are connected to one another in the middle of the vehicle by an actuator 2 shown as an essentially cylindrical body.

In a manner known as such, the adjustable roll stabilizer 1 is mounted so that it can rotate relative to the vehicle body 10 about a rotational axis 3, for which purpose a stabilizer mounting 11a on the left and a stabilizer mounting 11b on the right are provided, which mountings, as shown in FIG. 1, surround areas of the respective stabilizer sections 6a and 6b in a U-shape—illustrated in a simplified manner.

The actuator 2 represented here as a cylindrical body 2 comprises a housing (not indexed) which is essentially rotationally symmetrical relative to the rotational axis 3 and in which an electric motor 4, a multi-step planetary gearset 5 and a rotational speed sensor 13 (each indicated only by indexes) are arranged. By way of the electric motor 4 and the multi-step planetary gearset 5, the stabilizer sections 6a and 6b are in driving connection with one another. When the actuator 2 is inactive, the two stabilizer sections 6a, 6b are connected solidly to one another by way of the inactive electric motor 4 and the multi-step planetary gearset 5 in driving connection with it. By operating the electric motor 4, however, and depending on the rotational direction of the electric motor 4 about the rotational axis 3, the stabilizer sections 6a, 6b can be twisted relative to one another. During this the multi-step planetary gearset 5 produces a fixed rotational speed ratio between the drive input (electric motor 4) and the drive output (stabilizer section 6b on the right, which is coupled to the output of the gearset). In that way the adjustable roll stabilizer 1 can be adjusted in a manner known as such.

Depending on the operating condition of the adjustable roll stabilizer 1 or the vehicle equipped with it, torsion can be produced between the stabilizer sections 6a, 6b coupled to one another by the actuator 2, depending on which a torque $M_{system}$ acting about the rotational axis 3 is developed. That torque $M_{system}$ is applied at the actuator 2 in the form of system torque.

With the help of the roll stabilizer 1, roll torque $M_{Wank}$ can be supported, which acts between the vehicle body 10 and the wheels 7a, 7b. By adjusting the roll stabilizer 1 the supportable roll torque $M_{Wank}$ can be influenced. For the regulation of the roll stabilizer 1 according to need, respective height level sensors 12a and 12b are associated with the left-hand wheel 7a and the right-hand wheel 7b, which sensors enable detection of wheel stroke movements of the wheel concerned and which emit these in the form of a height level z7a for the left-hand wheel and a height level z7b for the right-hand wheel. In addition, by way of the rotational speed sensor 13 the rotation of the electric motor 4 can be determined and this is emitted in the form of a rotational speed signal as a motor rotational speed n.

Below, the regulation of the adjustable roll stabilizer 1 shown schematically in FIG. 1 is explained in greater detail with reference to the regulation strategy shown in FIG. 2. According to this, a so-termed nominal system torque is adopted as an input magnitude for the regulation of the adjustable roll stabilizer 1. This is a magnitude specified for the vehicle, which corresponds to the torque $M_{system}$ acting about the rotational axis 3 (see FIG. 1) that should be supported by the adjustable roll stabilizer 1 at the level of the actuator, i.e. which engages at the actuator 2—comprising the electric motor 4 and the gearset 5—with the correct rotational direction about the rotational axis 3. Thus, by virtue of the combined kinematic action of the adjustable roll stabilizer 1, the wheel suspensions 7a, 7b, 8a, 8b, 9a, 9b and the connections 11a, 11b upon the vehicle body 10, the adjustable roll stabilizer 1 supports—at the vehicle level—an axle-related roll torque $M_{Wank}$ (see FIG. 1 orientated in the longitudinal direction of the vehicle).

The nominal system torque is converted by way of a known system rigidity into a rotational angle for the torque requirement, wherein the known system rigidity is composed of individual rigidities, in particular the rigidity of the stabilizer itself (stabilizer sections, gearset, housing, decoupling elements if present, hinged supports, stabilizer mountings and the like).

In parallel, the regulation of the adjustable roll stabilizer adopts a magnitude for the compensation of perturbations. For this, wheel movement data are detected by the height level sensors associated with the wheels, in the form of height level signals (for individual wheels) and a table of characteristic values for a decoupling angle (with previously determined vehicle-specific data) for determining a so-termed "zero-torque angle" is used, i.e. that angle which corresponds to the outermost rotational angle of the adjustable roll stabilizer, perhaps caused by an uneven road, and which would put the actuator of the adjustable roll stabilizer in a torque-free position. The two angles determined in this way, namely the rotational angle for the torque requirement and the zero-torque angle, are then added to obtain a target angle.

The target angle is then fed into a cascading position-rotational speed regulator. This comprises a position regulator which from the incoming target angle—and also having regard to a feedback signal from the motor—determines a target rotational speed, which in turn is passed to a rotational speed regulator. On the basis of the target rotational speed and a feedback from the electric motor (rotational speed), the rotational speed regulator determines a target motor torque for controlling the electric motor. The target motor torque is in turn fed into a field-orientated regulator which—again having regard to feedback signals from the electric motor—controls the electric motor 4 of the actuator 2. A motor output torque produced by the electric motor 4 is transformed—this time via a mechanical route—by way of a gear system 5 (multi-step planetary gearset) into a system torque, which acts between the stabilizer sections (see FIG. 1, indexes 6a and 6b).

Figure 2:
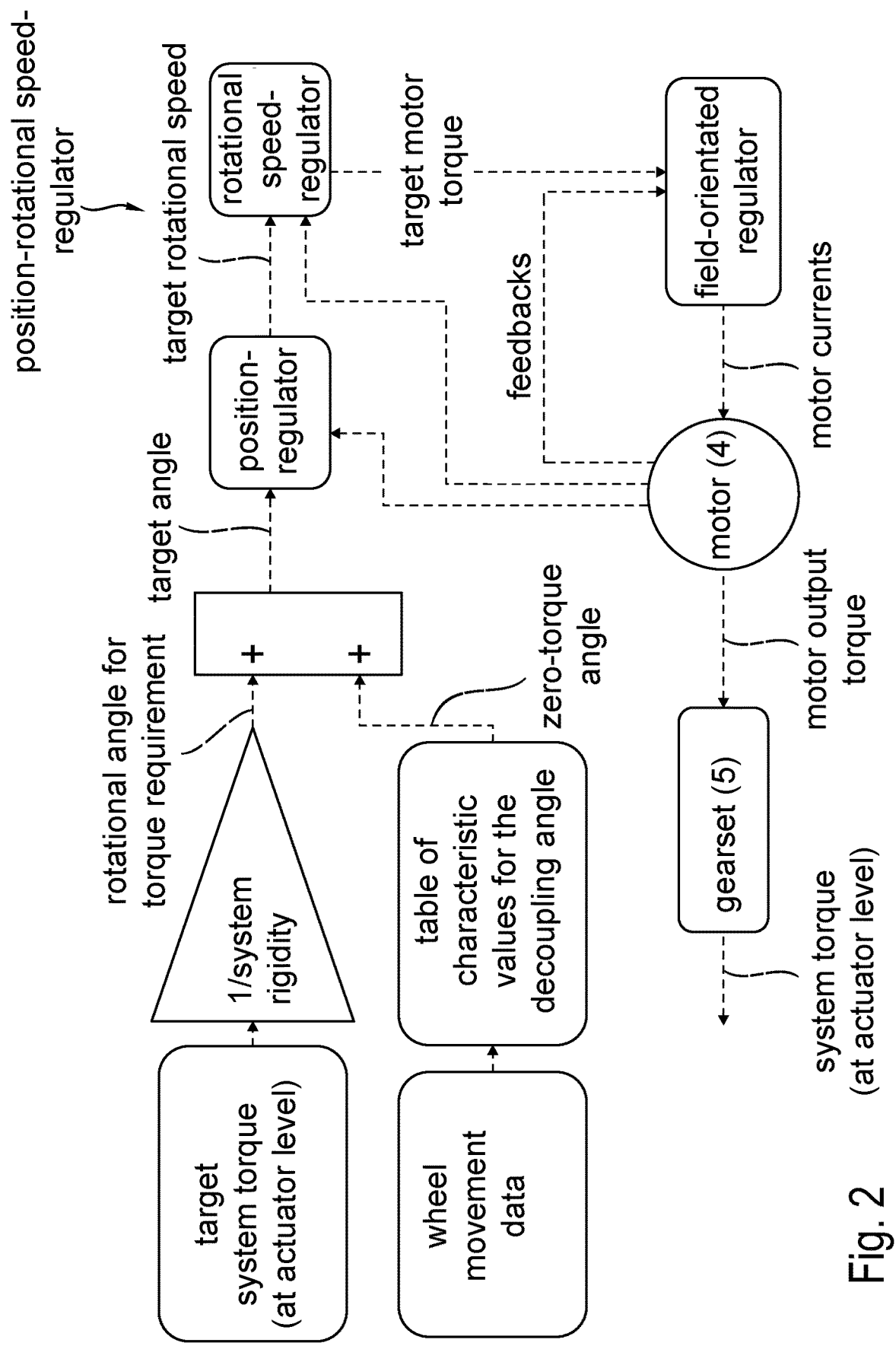
FIG. 2: A graphical representation of a regulating strategy for an adjustable roll stabilizer.

The regulation scheme shown in FIG. 2 is advantageously used with an adjustable roll stabilizer 1 of the type shown in FIG. 1. With the regulation principle described therein, an incoming system target torque is converted via the system rigidity into a target angle from which, by means of a position-rotational speed regulator, a target motor torque is determined, whereby the motor is acted upon with corresponding motor currents.

Figure 3:
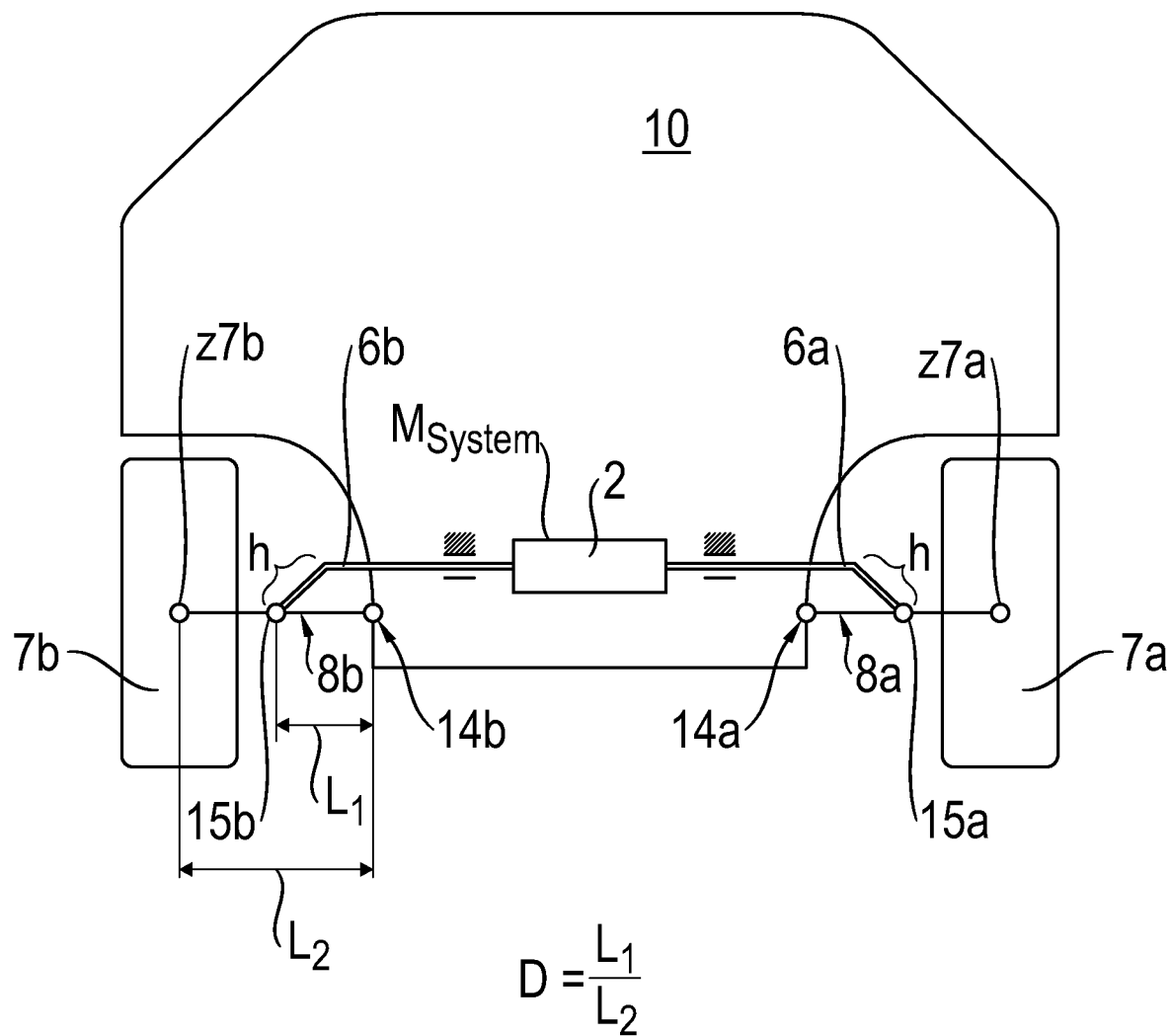
FIG. 3: A schematic representation of a motor vehicle fitted with an adjustable roll stabilizer, viewed in section as seen from the front.

For a further explanation of the invention reference should be made to FIG. 3, which shows a schematic representation of a motor vehicle fitted with an adjustable roll stabilizer, viewed in section from the front. The motor vehicle is represented only indicatively and partially by a vehicle body 10 and an axle shown as an example and in a simplified manner, wherein the vehicle body 10 is supported on a road (not shown) by means of a control arm arrangement 8a and a left-hand wheel 7a and by means of a right-hand control arm arrangement 8b and a right-hand wheel 7b.

In a manner already seen and already described with reference to FIG. 1, the motor vehicle is fitted with an adjustable roll stabilizer. This has as an essential feature an actuator 2 arranged approximately in the middle of the vehicle, which is connected on either side with a stabilizer section 6a on the left and a stabilizer section 6b on the right, in order to be able to rotate those sections relative to one another about the rotational axis (not shown here for representational reasons).

In an area radially a distance away from the rotational axis, each of the stabilizer sections 6a, 6b is coupled to a wheel suspension. Again for the sake of simplicity, in the representation in FIG. 3 the hinged supports have not been shown. Correspondingly, in FIG. 3 the stabilizer sections 6a, 6b—otherwise than in a customary chassis structure, which would comprise hinged supports acting between them (and thus in a supplementary sense)—are respectively coupled directly by a left-hand stabilizer connection 15a (and a right-hand stabilizer connection 15b) to a control arm arrangement 8a on the left (and a control arm arrangement 8b on the right).

Each of the control arm arrangements 8a, 8b is articulated to the vehicle body 10 in a connection area by respective left-hand control arm connections 14a and 14b.

In FIG. 3 a lever arm length h is shown for each of the stabilizer sections 6a, 6b. This lever arm length h represents a radial distance between the left-hand stabilizer connection 15a (or the right-hand stabilizer connect ion 15b) [coupling point of the stabilizer section 6a or 6b and the control arm arrangement 8a or 8b] and the rotational axis 3, and is therefore the lever arm length of the respective stabilizer section 6a, 6b relative to the rotational axis 3.

Associated with each of the wheels 7a, 7b there is a respective height level sensor 12a, 12b. By means of the height level sensors 12a, 12b, for each wheel a height level of the wheel concerned (relative to the vehicle body 10) is detected and made available for the control of the adjustable roll stabilizer.

Furthermore, a dimensioning relationship is indicated in FIG. 3. According to this, the distance between the stabilizer connection 15a (or 15b respectively) and the corresponding control arm connection 14a (or 14b) is called $L_1$. The distance between the middle of each wheel 7a or 7b and the corresponding control arm connection 14a or 14b, respectively, is called $L_2$. Thus, for an adjustable roll stabilizer or a motor vehicle fitted with one a kinematic characteristic magnitude in the sense of a length ratio D is obtained, which is calculated as the ratio $L_1$ to $L_2$ as indicated at the bottom of FIG. 3. This length ratio can also be called the "drop link ratio". On the basis of a geometrical approximation (linearization) the length ratio D provides a relationship between the vertical movement of a mid-point of a wheel 7a, 7b and the vertical movement of the associated stabilizer connection 15a (or 15b).

Figure 4:
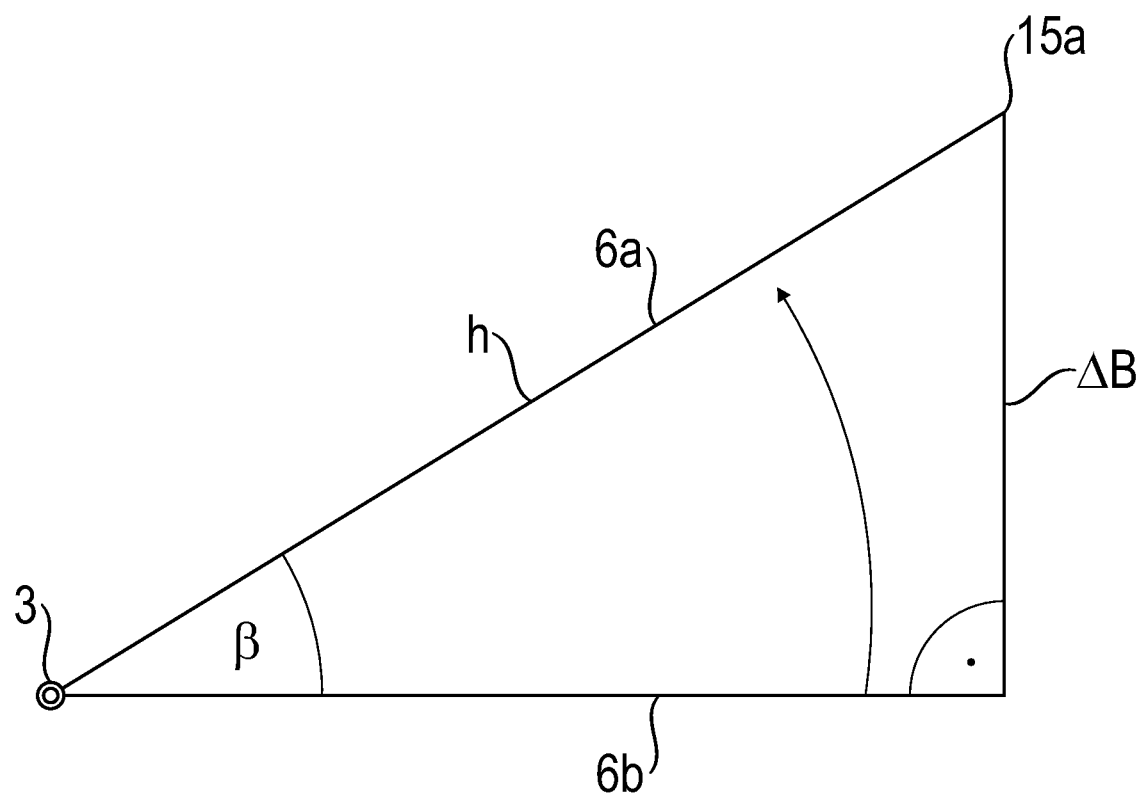
FIG. 4: A representation of the principle, designed to explain a geometrical relationship at the adjustable roll stabilizer.

FIG. 4 shows an illustration of a principle for explaining a further geometrical relationship that can be used in the context of the invention with an adjustable roll stabilizer. The representation is based on a simplified model of an adjustable roll stabilizer, which is sketched in principle, viewed as a lateral section (with the plane of the section perpendicular to the rotational axis 3). Specifically, the roll stabilizer is shown in a twisted condition represented—again in a simplified manner—by a right-angled triangle. The representation is an approximation for small angles. In actual fact (otherwise than in the representation shown in FIG. 4) the stabilizer sections 6a and 6b are of equal length. In the model, however, to be able to use the computationally simple angle function (sine function) it is assumed that the arm lengths are different. With comparatively little computational effort the approximation provides relatively accurate results for small angles.

As can be seen, the left- and right-hand stabilizer sections 6a and 6b are twisted relative to one another about the rotational axis 3 by the stabilizer angle β. Here, the stabilizer section 6a has a lever arm length of h (see the representation and explanation of FIG. 3), which is the hypotenuse of the right-angled triangle. In relation to the stabilizer angle β the opposite side of the right-angled triangle is denoted ΔB, which expresses an adjustment path (vertical height difference between the stabilizer connections 15a, 15b) of the two wheels 7a, 7b.

According to the trigonometric relationship in the right-angled triangle:

$$\sin β = ΔB/h.$$

Here, ΔB corresponds to the deflection difference of the height levels z7a and z7b of the wheels 7a, 7b multiplied by the length ratio D, where $$D = L_1/L_2.$$

Thus:

$$\sin β = \text{deflection difference} * D/h.$$

Thus, in the inverse function, for the stabilizer angle β the calculation basis obtained is:

$$β = \arcsin(\text{deflection difference} * D/h).$$

Accordingly, using the indicated calculation basis for the stabilizer angle β, on the basis of a difference between the sensor-determined height levels z7a and z7b of the wheels 7a and 7b in combination with the kinematic characteristic magnitudes $L_1$, $L_2$ and h of the chassis geometry of the adjustable roll stabilizer or the motor vehicle fitted with it, the stabilizer angle β can be calculated. The calculation is based on a model of the adjustable roll stabilizer approximated by linear kinematics.

The calculated values for the stabilizer angle β can be used in the context of the invention and in particular to check the plausibility of a value of the stabilizer angle β determined by some other method, i.e. to check approximately whether or not, in light of the operating situation detected, it is acceptable, comprehensible and/or reasonable.

Since the only input magnitudes needed are in any case the sensor-determined height levels z7a and z7b, besides structural characteristics ($L_1$, $L_2$ and h) of the vehicle's geometry, and since the calculation is comparatively simple to carry out, in this way a plausibility check can be carried out during on-going operation of the adjustable roll stabilizer.

Whereas during routine operation of the adjustable roll stabilizer the plausibility check should give a positive result, so that there is no need for further action, it is expediently provided that in the event that the plausibility is found to be lacking an error reaction is triggered. This is because in such a case the approximately calculated values for the stabilizer angle to be set differ too much from the values determined by virtue of the stored relationship, so that something is clearly amiss.

INDEXES

1 Adjustable roll stabilizer
2 Actuator
3 Rotational axis
4 Electric motor
5 Multi-step planetary gearset
6a, 6b Left-hand (or right-hand) stabilizer section
7a, 7b Left-hand (or right-hand) wheel
8a, 8b Left-hand (or right-hand) control arm arrangement
9a, 9b Left-hand (or right-hand) hinged support
10 Vehicle body
11a, 11b Left-hand (or right-hand) stabilizer mounting 12a, 12b Height level sensor for the left-hand (or right-hand) wheel
13 Rotational speed sensor
14a, 14b Left-hand (or right-hand) control arm connection
15a, 15b Left-hand (or right-hand) stabilizer connection
β Stabilizer angle
ΔB Adjustment path
h Lever arm length of stabilizer section
z7a, z7b Height level of left-hand (or right-hand) wheel
D Length ratio ($L_2$ to $L_2$)
$L_1$ Distance from stabilizer connection to control arm connection
$L_2$ Distance between the middle of the wheel and the control arm connection
$M_{Wank}$ Roll torque (relative to the axis)
$M_{system}$ System torque
n Motor rotational speed

The invention claimed is:

1. A method for operating an adjustable roll stabilizer for a motor vehicle, the adjustable roll stabilizer has an actuator which is rotatable through a system angle in relation to a rotational axis to apply a system torque and to rotate two stabilizer sections connected thereto relative to one another about the rotation axis, the stabilizer sections are, in each case, coupled radially a distance away from the rotation axis to a respective wheel suspension and, depending on the system angle and under an external influence of movement of the wheel suspensions, twist relative to one another through a stabilizer angle, the method comprising:
   determining, by sensors, height levels of wheels,
   controlling the actuator, in context of a perturbation magnitude regulation, as a function of the stabilizer angle, which is determined from the height levels of the wheels by virtue of a stored relationship for at least one of the adjustable roll stabilizer and the motor vehicle,
   checking a plausibility of the stored relationship between the height levels of the wheels and the stabilizer angle by a model calculation, and
   using a model of the adjustable roll stabilizer approximated by linear kinematics for the model calculation, and only a magnitude of a difference between the height levels of the wheels being input into the model calculation to carry out the plausibility check.

2. The method according to claim 1, further comprising defining the stored relationship between the height levels of the wheels and the stabilizer angle as a characteristic which has been determined by measurements on either the adjustable roll stabilizer or the motor vehicle equipped therewith.

3. The method according to claim 1, further comprising basing the model calculation on a kinematic conversion of the sensor-determined height levels of the wheels to a calculated stabilizer angle which, as the plausibility check, is compared with the stabilizer angle concluded from the stored relationship.

4. The method according to claim 3, further comprising basing the kinematic conversion on a difference of the sensor-determined height levels of the wheels in combination with characteristic kinematic magnitudes of at least one of a chassis geometry of the adjustable roll stabilizer and or the motor vehicle fitted with the adjustable roll stabilizer.

5. The method according to claim 1, further comprising carrying out the plausibility check during on-going operation of the adjustable roll stabilizer.

6. The method according to claim 1, further comprising triggering an error reaction when the stored relationship between the height levels of the wheels and the stabilizer angle is implausible.

7. A method for operating an adjustable roll stabilizer for a motor vehicle, the adjustable roll stabilizer has an actuator which is rotatable through a system angle in relation to a rotational axis to apply a system torque, to rotate two stabilizer sections connected thereto relative to one another about the rotation axis, the stabilizer sections are, in each case, coupled radially a distance away from the rotation axis to a respective wheel suspension and, depending on the system angle and under an external influence of movement of the wheel suspensions, twist relative to one another through a stabilizer angle, the method comprising:
   controlling the actuator, in context of a perturbation magnitude regulation, as a function of the stabilizer angle, which is determined from height levels of wheels determined by sensors, by virtue of a stored relationship for at least one of the adjustable roll stabilizer and the motor vehicle,
   checking the plausibility of the stored relationship between the height levels of the wheels and the stabilizer angle by a model calculation,
   basing the model calculation on a kinematic conversion of the sensor-determined height levels of the wheels to a calculated stabilizer angle which, as a plausibility check, is compared with the stabilizer angle concluded from the stored relationship, and
   calculating the stabilizer angle as:

$$\beta = \arcsin(\text{deflection difference} * D/h),$$

wherein:
   deflection difference=difference between the height levels of the wheels;
   D=ratio between a distance from the stabilizer connection to the control arm connection and a distance between the middle of the wheel and the control arm connection; and
   h=lever arm length of the stabilizer section (radial distance from the stabilizer connection to the rotational axis).

8. A system for roll stabilization, which is designed to carry out a method for operating an adjustable roll stabilizer for a motor vehicle, the adjustable roll stabilizer has an actuator which is rotatable through a system angle in relation to a rotational axis to apply a system torque, to rotate two stabilizer sections connected thereto relative to one another about the rotation axis, the stabilizer sections are, in each case, coupled radially at a distance away from the rotation axis to a respective wheel suspension and, depending on the system angle and under an external influence of movements of the wheel suspensions, the stabilizer sections twist relative to one another through a stabilizer angle, the method for operating an adjustable roll stabilizer including determining height levels of wheels with sensors; controlling, in context of a perturbation magnitude regulation, the actuator as a function of the stabilizer angle, which is determined from the height levels of the wheels by virtue of a stored relationship for at least one of the adjustable roll stabilizer and the motor vehicle, and checking the plausibility of the stored relationship between the height levels of the wheels and the stabilizer angle by means of a model calculation which requires the input of only a magnitude of a difference between the height levels of the wheels to carry out the plausibility check.

* * * * *